United States Patent
Otaki et al.

(10) Patent No.: US 12,188,614 B2
(45) Date of Patent: Jan. 7, 2025

(54) STRAINER

(71) Applicants: JATCO Ltd, Fuji (JP); NISSAN MOTOR CO., LTD., Yokohama (JP)

(72) Inventors: Tomoya Otaki, Isehara (JP); Akiko Imai, Isehara (JP); Daisuke Taki, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/260,265

(22) PCT Filed: Jan. 26, 2022

(86) PCT No.: PCT/JP2022/002823
§ 371 (c)(1),
(2) Date: Jul. 3, 2023

(87) PCT Pub. No.: WO2022/163689
PCT Pub. Date: Aug. 4, 2022

(65) Prior Publication Data
US 2024/0295290 A1    Sep. 5, 2024

(30) Foreign Application Priority Data
Jan. 29, 2021  (JP) .................. 2021-013971

(51) Int. Cl.
*F16N 39/06*    (2006.01)
(52) U.S. Cl.
CPC ................... *F16N 39/06* (2013.01)

(58) Field of Classification Search
CPC ........... F16H 39/06; F16H 57/04; F16H 61/00
USPC .................................. 184/6.24, 106
See application file for complete search history.

(56) References Cited

U.S. PATENT DOCUMENTS

| | | | | |
|---|---|---|---|---|
| 4,889,621 A | * | 12/1989 | Yamada | B01D 35/0273 210/450 |
| 5,853,577 A | * | 12/1998 | Gizowski | B29C 66/1312 210/416.5 |
| 6,165,373 A | * | 12/2000 | Agner | B01D 35/0273 95/268 |
| 8,038,877 B2 | * | 10/2011 | Stausberg | F01M 11/0004 184/6.24 |
| 10,837,329 B2 | * | 11/2020 | Parrish | F01M 11/0004 |
| 2024/0093703 A1 | * | 3/2024 | Sugano | F16H 57/0441 |

FOREIGN PATENT DOCUMENTS

JP    2004-332886 A    11/2004

* cited by examiner

*Primary Examiner* — Michael R Mansen
*Assistant Examiner* — Mark K Buse
(74) *Attorney, Agent, or Firm* — Foley & Lardner LLP

(57) ABSTRACT

A strainer has an inlet for oil; a filter through which the oil that has flowed in from the inlet passes from inside to outside; a first supply port for supplying, to a first oil pump, the oil that has passed through the filter; a second supply port for supplying, to an intermittently driven second oil pump, the oil that has passed through the filter. The second supply port is located more upward than the first supply port; and the filter has a region located below the second supply port.

8 Claims, 9 Drawing Sheets

STRAINER

TECHNICAL FIELD

The present invention relates to a strainer.

BACKGROUND ART

In a vehicle, an oil supply device for supplying oil to the transmission is provided. Below the vehicle, an oil pan for storing oil is provided. The oil supply device sucks in oil from the oil pan through an oil pump. The oil supply device adjusts the oil pressure of the sucked oil and supplies it to the transmission. The oil supply device is equipped with a strainer for filtering the oil. The oil in the oil pan is sucked into the oil pump through the strainer.

The oil supply device may include two oil pumps, a mechanical oil pump and an electric oil pump (for example, refer to Patent Document 1). The mechanical oil pump is driven by the driving force of the engine, which is the vehicle drive source. The electric oil pump is driven by the driving force of a motor provided separately from the vehicle drive source. The electric oil pump is intermittently driven, for example, when the oil supply by the mechanical oil pump is stopped, or when the oil supply by the mechanical oil pump is insufficient.

CITATION LIST

Patent Literature

Patent Document 1: Japanese Patent Application Laid-Open No. 2004-332886

SUMMARY OF INVENTION

The strainer is provided with supply ports for supplying oil to each of the two oil pumps. In this case, the oil filtered by the strainer contains air. The air may move to the upper part of the strainer and form an air pool. If the supply port is provided at the upper part of the strainer, an air pool may be formed around the supply port. When the electric oil pump is driven in a state where an air pool is formed in the strainer, the electric oil pump may suck in air and spin idly. If the electric oil pump spins idly, there is a possibility that the oil discharge may be delayed.

In the strainer, it is required to reduce the formation of air pools and decrease the air intake of the electric oil pump.

A strainer in one aspect of the present invention, comprises:
an inlet for oil;
a filter through which the oil that has flowed in from the inlet passes from inside to outside;
a first supply port for supplying, to a first oil pump, the oil that has passed through the filter; and
a second supply port for supplying, to an intermittently driven second oil pump, the oil that has passed through the filter;
wherein the second supply port is located more upward than the first supply port; and
the filter has a region located below the second supply port.

According to one aspect of the present invention, the formation of air pools in the strainer can be reduced, and the air intake of the second oil pump can be decreased.

DESCRIPTION OF EMBODIMENTS

Figure 1:
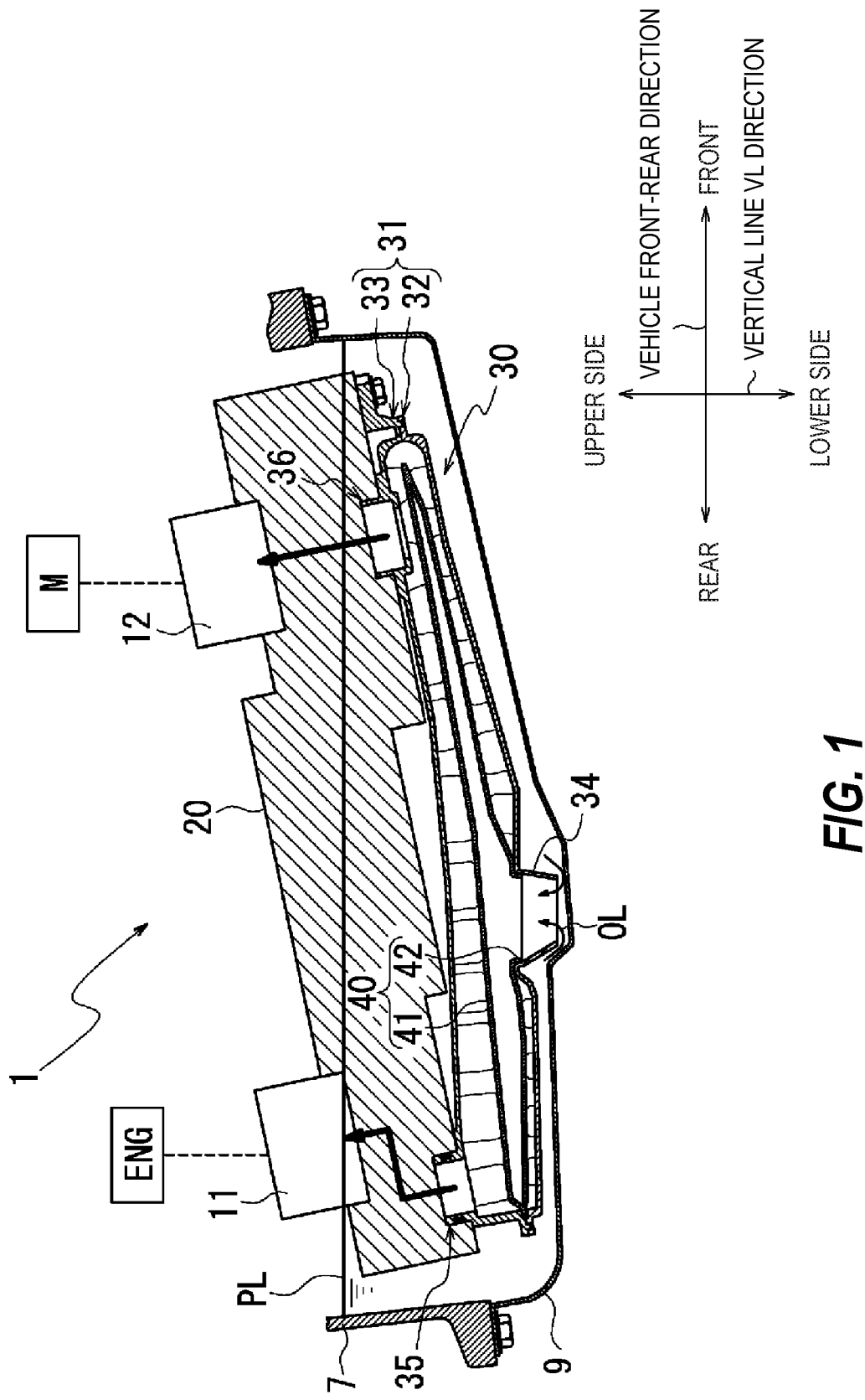
FIG. 1 is a schematic diagram showing the configuration of the oil supply device.

First, the definitions of terms in this specification will be explained. "Overlapping in a predetermined direction view" means that multiple elements are arranged in a predetermined direction, and is synonymous with the description of "overlapping in a predetermined direction." The "predetermined direction" is, for example, the axial direction, radial direction, gravitational direction (vertical line direction), vehicle front-rear direction, etc.

In the drawings, if it is shown that multiple elements (components, parts, etc.) are arranged in a predetermined direction, it can be considered that there is a description in the specification explaining that they overlap in the predetermined direction view.

"Not overlapping in a predetermined direction view" and "offset in a predetermined direction view" mean that multiple elements are not arranged in a predetermined direction, and are synonymous with "not overlapping in a predetermined direction" and "offset in a predetermined direction." The "predetermined direction" can be, for example, the axial direction, radial direction, gravitational direction, vehicle front-rear direction (vehicle forward direction, vehicle reverse direction), etc.

In the drawings, if it is shown that multiple elements (components, parts, etc.) are not arranged in a predetermined direction, it can be considered that there is a description in the specification explaining that they do not overlap in the predetermined direction view.

"In a predetermined direction view, the first element (component, part, etc.) is located between the second element (component, part, etc.) and the third element (component, part, etc.)" means that when observed from a predetermined direction, it can be observed that the first element is located between the second element and the third element. The "predetermined direction" includes the axial direction, radial direction, gravitational direction, vehicle travel direction (vehicle forward direction, vehicle reverse direction), etc.

For example, when the second element, the first element, and the third element are arranged along the axial direction in this order, it can be said that, in the radial direction view, the first element is located between the second element and the third element. If it is illustrated in the drawings that the first element is located between the second and third elements in a predetermined direction view, it is acceptable to consider that there is a description in the specification that the first element is located between the second and third elements in the predetermined direction view.

In the following, an embodiment in one aspect of the present invention will be described with reference to the drawings. In the embodiment, as an example, a strainer provided in an oil supply device installed in a vehicle is described. The oil supply device, for example, supplies oil to a belt continuously variable transmission or the like, which operates by hydraulic pressure.

FIG. 1 is a schematic diagram showing the configuration of the oil supply device 1.

As shown in FIG. 1, a transmission case 7 housing the transmission mechanism (not shown) of a belt continuously variable transmission is provided in the vehicle. An oil pan 9 for storing oil OL is provided at the lower part in the vertical line VL direction of the transmission case 7. Here, the vertical line VL direction means the vertical line VL direction based on the mounting state of the transmission case 7 on the vehicle. In addition, when described as "upper side," "upward," "lower side," and "downward" in the following description, they mean the "upper side," "upward," "lower side," and "downward" in the vertical line VL direction based on the mounting state of the transmission case 7 on the vehicle.

Furthermore, in the following description, the notations "front side" and "rear side" mean the "front side" and "rear side" in the front-rear direction of the vehicle.

The oil pan 9 covers the lower opening of the transmission case 7. Inside the oil pan 9, an oil pool PL, which is the source of oil, is formed. During the forward movement of the vehicle, the oil OL in the oil pool PL tends to shift towards the rear side in the vehicle front-rear direction. Therefore, the oil pan 9 attached to the transmission case 7 is inclined so that the oil pan 9 is positioned upward from the rear to the front in the vehicle front-rear direction. The depth from the liquid surface of the oil pool PL to the bottom surface is deeper on the rear side than on the front side. In other words, the oil pool PL is designed to store more oil OL on the rear side than on the front side.

The oil supply device 1 includes a mechanical oil pump 11 (first oil pump), an electric oil pump 12 (second oil pump), a control valve body 20, and a strainer 30. In FIG. 1, the mechanical oil pump 11, the electric oil pump 12, and the control valve body 20 are shown schematically.

The mechanical oil pump 11 and the electric oil pump 12 draw oil OL from the oil pool PL.

The mechanical oil pump 11 is an oil pump driven by rotation input from a vehicle drive source, such as an engine ENG. The mechanical oil pump 11 can switch between operation and stoppage in conjunction with the operation and stoppage of the vehicle drive source.

The electric oil pump 12 is driven by rotation input from a motor M installed separately from the vehicle drive source. The operation and stoppage of the electric oil pump 12 can be switched by a control device (not shown) that switches the operation and stoppage of the motor.

The electric oil pump 12, for example, is driven when the oil OL supply by the mechanical oil pump 11 is stopped, or when the oil OL supply amount from the mechanical oil pump 11 is insufficient. In other words, the electric oil pump 12 is intermittently driven. The electric oil pump 12 may be operated, for example, during vehicle idling stop, etc., as a substitute for the mechanical oil pump 11 when the mechanical oil pump 11 is stopped. Alternatively, the electric oil pump 12 may be operated in conjunction with the mechanical oil pump 11 when a large oil pressure is required, such as during a downshift of the belt continuously variable transmission.

Although not shown in the figures, a pressure regulating circuit is provided inside the control valve body 20. The oil OL discharged by the mechanical oil pump 11 and the electric oil pump 12 is regulated by the pressure regulating circuit and supplied to the transmission mechanism.

The strainer 30 is located at the lower part of the control valve body 20. Similar to the oil pan 9, the strainer 30 is inclined upward from the rear to the front in the vehicle front-rear direction.

The strainer 30 is connected to the electric oil pump 12 and the mechanical oil pump 11 through an oil passage (not shown) formed inside the control valve body 20. The strainer 30 filters the oil OL in the oil pool PL and supplies it to the electric oil pump 12 and the mechanical oil pump 11.

Figure 2:
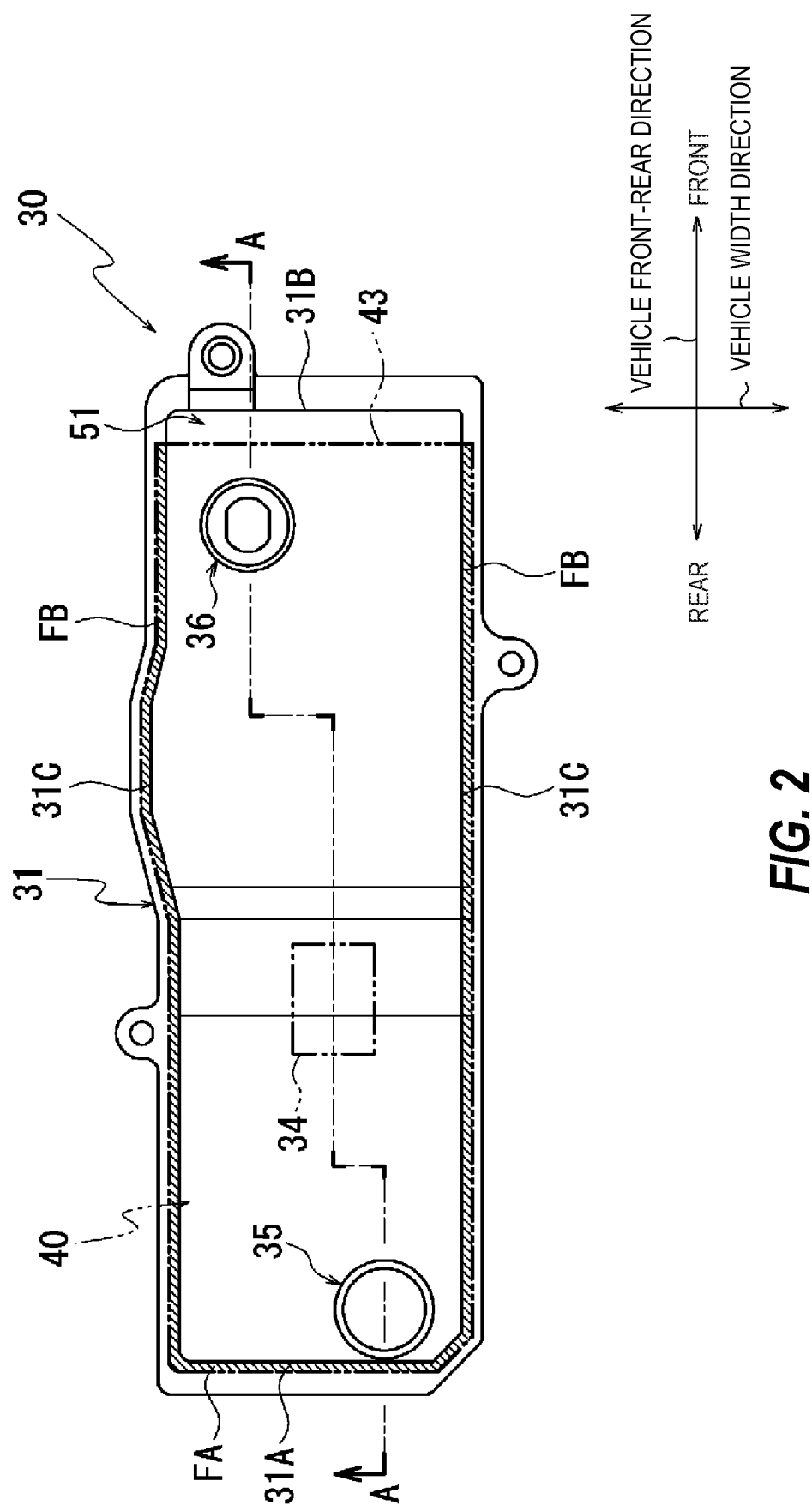
FIG. 2 is a schematic diagram of the strainer viewed from above.

FIG. 2 is a schematic view of the strainer 30 as viewed from above.

Figure 3:
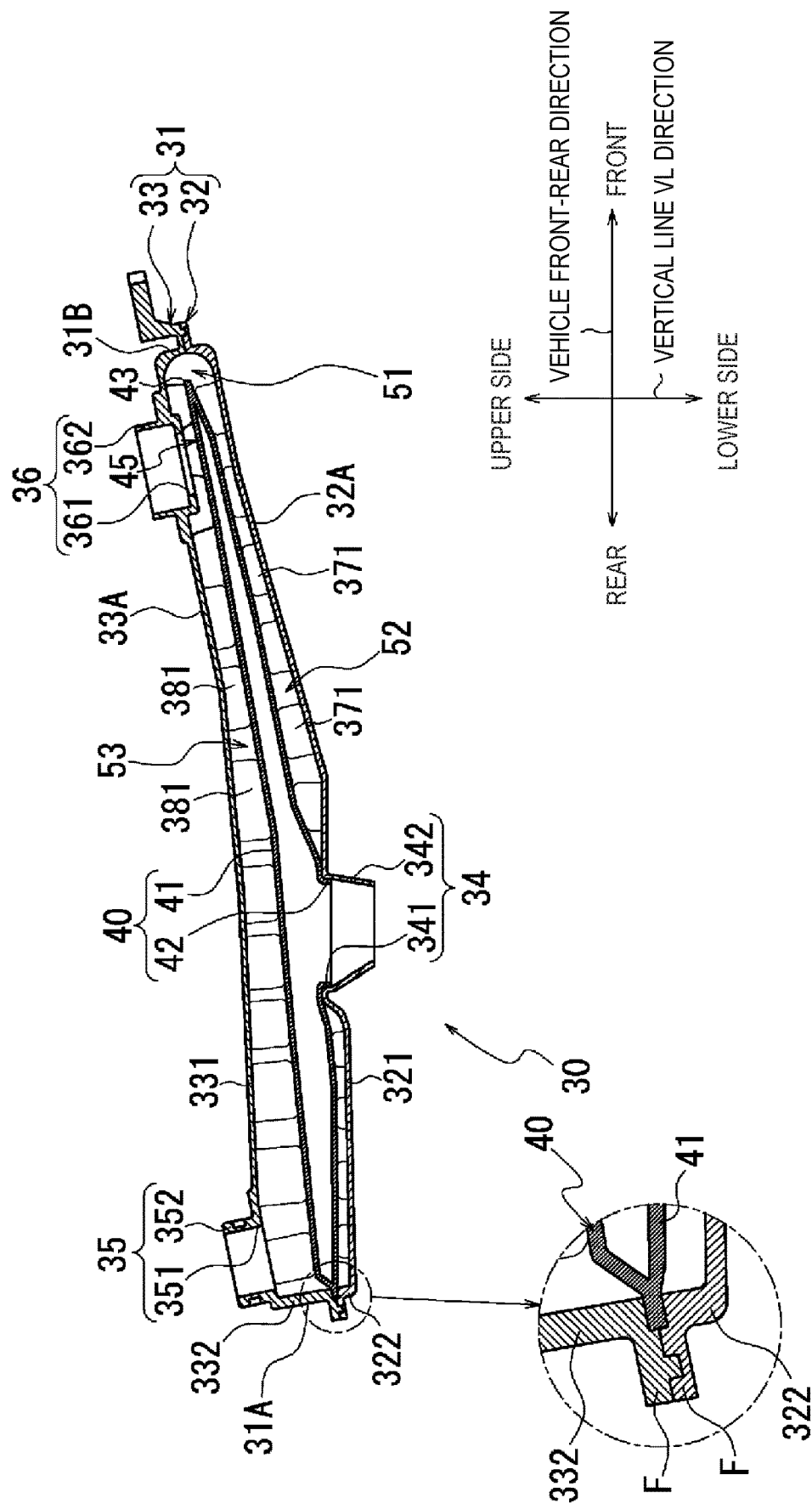
FIG. 3 is a cross-sectional view taken along line A-A of FIG. 2.

FIG. 3 is a sectional view taken along the line A-A of FIG. 2.

Figure 4:
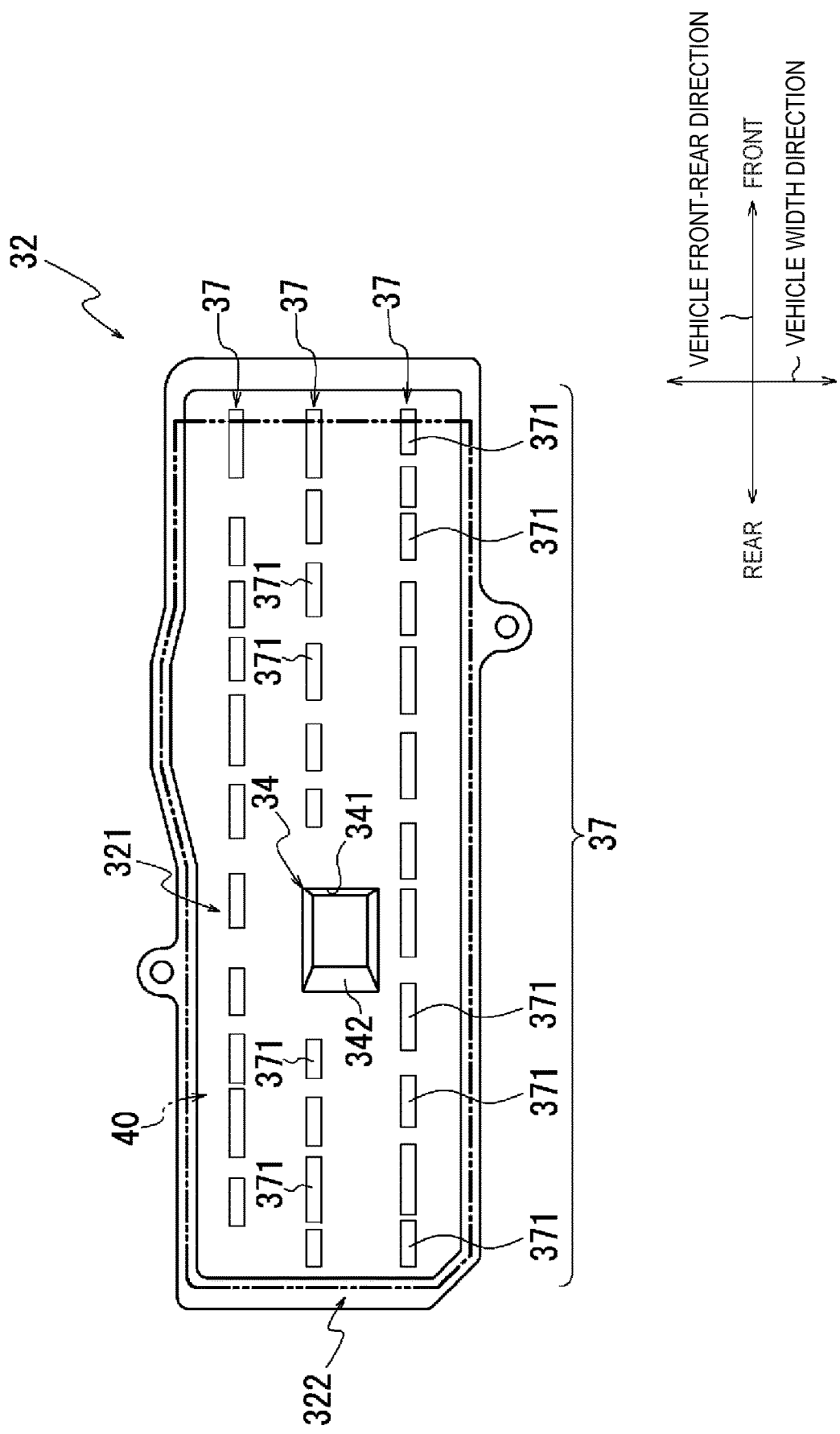
FIG. 4 is a schematic diagram of the lower case viewed from above.

FIG. 4 is a schematic view of the lower case 32 as viewed from above.

Figure 5:
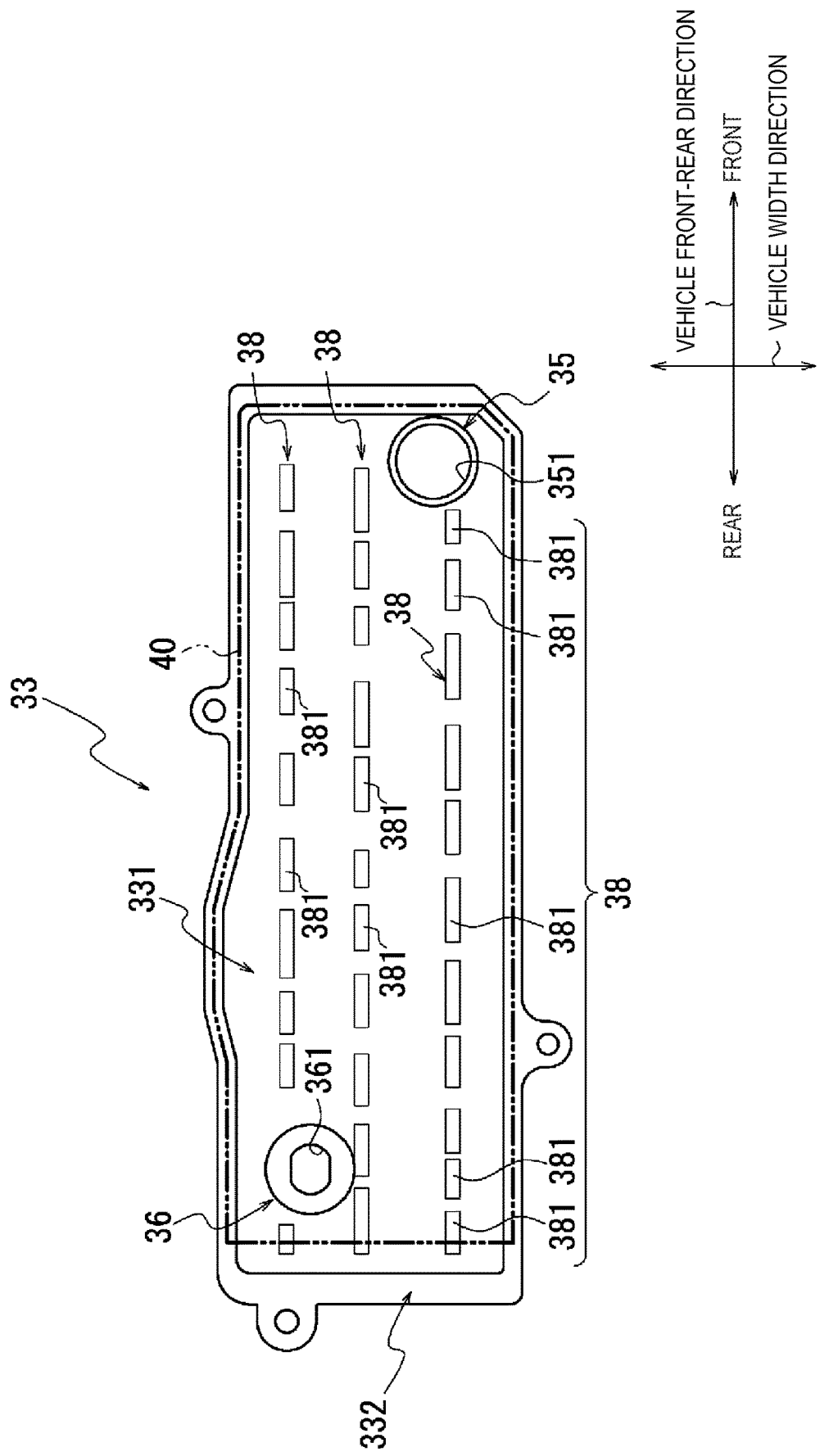
FIG. 5 is a schematic diagram of the upper case viewed from below.

FIG. 5 is a schematic view of the upper case 33 as viewed from below.

Figure 6:
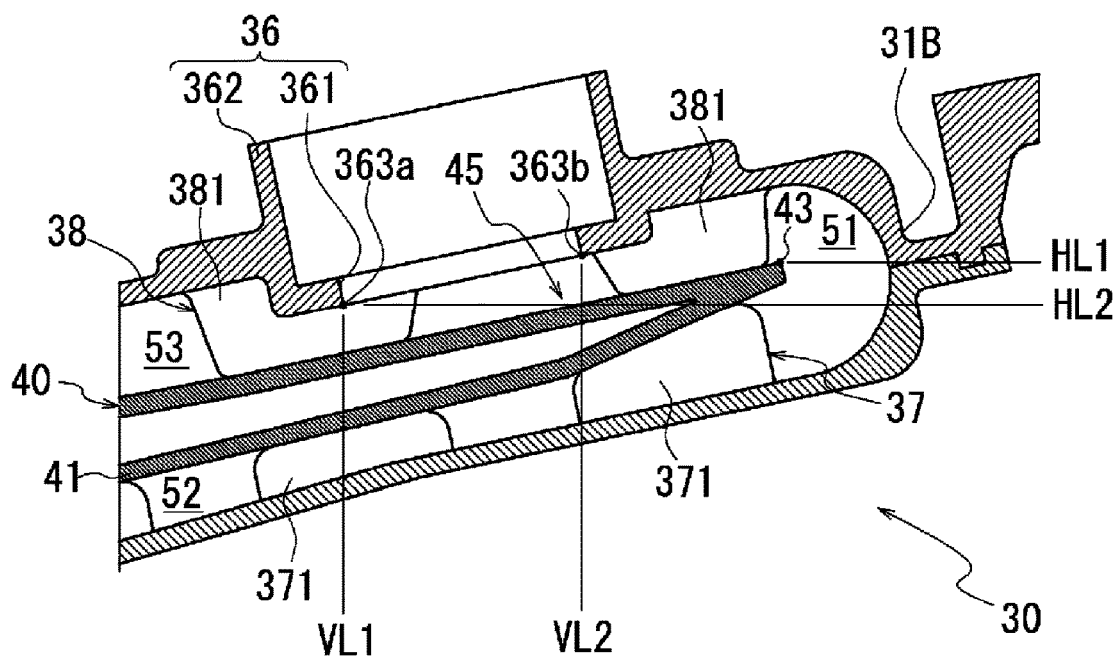
FIG. 6 is an enlarged view around the front end portion of the strainer.
Figure 6:
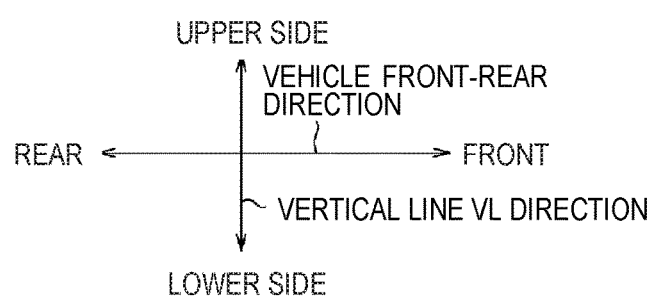

FIG. 6 is an enlarged view of the area around the front end portion 31B of the strainer 30.

As shown in FIG. 2, the strainer 30 is equipped with a substantially rectangular case 31. As shown in FIG. 3, a filter 40 for filtering oil OL is arranged inside the case 31. Note that FIGS. 2, 4, and 5 show the position of the filter 40 with a dashed line.

As shown in FIG. 2, the case 31 has a rectangular shape when viewed from above. The case 31 is arranged such that its longitudinal direction extends along the vehicle front-rear direction. The case 31 is arranged such that its transverse direction extends along the vehicle width direction. Here, the vehicle width direction is a direction orthogonal to the vehicle front-rear direction and the vertical line VL direction.

The case 31 has one end portion (hereinafter referred to as rear end portion 31A) positioned rearward in the vehicle front-rear direction, and the other end portion (hereinafter referred to as front end portion 31B) positioned forward. The rear end portion 31A and the front end portion 31B are arranged along the vehicle width direction. The case 31 has side end portions 31C, 31C connecting the rear end portion 31A and the front end portion 31B at both ends of the vehicle width direction. The side end portions 31C, 31C extending in the longitudinal direction of the case 31 are arranged along the vehicle front-rear direction.

As shown in FIG. 3, the case 31 is composed of a lower case 32 and an upper case 33.

As shown in FIG. 4, the lower case 32 is equipped with a rectangular bottom wall portion 321 and a peripheral wall portion 322 extending upward around the outer periphery of the bottom wall portion 321.

As shown in FIG. 5, the upper case 33 is equipped with a rectangular upper wall portion 331 and a peripheral wall portion 332 extending downward around the outer periphery of the upper wall portion 331.

As shown in the enlarged area of FIG. 3, the flange F at the upper end of the peripheral wall portion 322 of the lower case 32 and the flange F at the lower end of the peripheral wall portion 332 of the upper case 33 are overlapped and joined together.

In the bottom wall portion 321 of the lower case 32, an oil OL inlet 34 is provided. The inlet 34 is composed of an opening 341 formed in the bottom wall portion 321, and a peripheral wall portion 342 surrounding the opening 341. The peripheral wall portion 342 protrudes downward in the vertical line VL direction. The peripheral wall portion 342 communicates with the outside of the case 31 at its lower end.

In the upper wall portion 331 of the upper case 33, two supply ports 35 and 36 are provided. As shown in FIG. 2, the supply ports 35 and 36 are spaced apart in the vehicle front-rear direction. The supply ports 35 and 36 are offset in the vehicle width direction. In other words, the supply ports 35 and 36 do not overlap when viewed from the vehicle front-rear direction. The supply port 35 (first supply port) is provided near the rear end portion 31A of the case 31. The supply port 36 (second supply port) is provided near the front end portion 31B of the case 31.

As shown in FIG. 3, the upper case 33 has an inclined portion 33A on the front end portion 31B side (right side in the figure) of the vehicle front-rear direction rather than the substantially central part. The inclined portion 33A is inclined upward as away from the rear end portion 31A.

The supply port 36 is located in the inclined portion 33A. Due to the inclination of the inclined portion 33A, the supply port 36 is positioned on the upper side (upward) in the vertical line VL direction compared to the supply port 35.

In this embodiment, the lower case 32 also has an inclined portion 32A on the front end portion 31B side. The inclined portion 32A is located on the front end portion 31B side (right side in the figure) in the vehicle front-rear direction, farther from the inlet 34. The inclined portion 32A is inclined upward as away from the rear end portion 31A.

The case 31 is inclined on the front end portion 31B side relative to the rear end portion 31A side by having the inclined portions 33A and 32A. The lower case 32 is not limited to having the inclined portion 32A. The front end portion 31B side of the lower case 32 may be substantially horizontal relative to the rear end portion 31A side.

The supply port 35 is equipped with an opening 351 that penetrates the upper wall portion 331 in the vertical line VL direction, and a cylindrical portion 352 that surrounds the opening 351. The cylindrical portion 352 protrudes upward in the vertical line VL direction. The cylindrical portion 352 communicates with the outside of the case 31 at its upper end.

The supply port 36 is equipped with an opening 361 that penetrates the upper wall portion 331 in the vertical line VL direction, and a cylindrical portion 362 that surrounds the opening 361. The cylindrical portion 362 protrudes upward in the vertical line VL direction. The cylindrical portion 362 communicates with the outside of the case 31 at its upper end.

The supply port 36 is inclined along the inclination of the inclined portion 33A. The supply port 36 is inclined so as to be positioned on the upper side as away from the rear end portion 31A. As shown in FIG. 6, the end (hereinafter referred to as the upper end 363b) on the front end portion 31B side of the opening 361 is positioned on the upper side in the vertical line VL direction compared to the end (hereinafter referred to as the lower end 363a) on the rear end portion 31A side of the opening 361. The lower end 363a of the opening 361 corresponds to the lower end of the supply port 36.

As shown in FIG. 1, the supply port 35 communicates with the mechanical oil pump 11 through an oil passage (not shown) formed in the control valve body 20. The supply port 36 communicates with the electric oil pump 12 through an oil passage (not shown) formed in the control valve body 20. Although not shown, a check valve is provided in the supply port 36. When the electric oil pump 12 is stopped, the oil passage communicating with the supply port 36 is closed by the check valve to prevent backflow of oil OL.

In FIG. 2, the position of the inlet 34 is shown by an imaginary line. The inlet 34 is provided near the center in the vehicle front-rear direction and vehicle width direction. The inlet 34 is provided at a distance from the supply port 35 and the supply port 36 when viewed from above. The inlet 34 is located between the supply port 35 and the supply port 36 in the vehicle front-rear direction. When viewed in the vehicle front-rear direction, a part of the inlet 34 overlaps with the supply port 35. When viewed in the vehicle front-rear direction, a part of the inlet 34 overlaps with the supply port 36.

As shown in FIG. 4, a plurality of rib rows 37 are formed in the bottom wall portion 321 of the lower case 32. Each rib row 37 is formed from a plurality of ribs 371 arranged along the vehicle front-rear direction. As shown in FIG. 3, each rib 371 protrudes upward in the vertical line VL direction from the bottom wall portion 321 of the lower case 32.

As shown in FIG. 4, a plurality of ribs 371 are arranged with intervals in the vehicle front-rear direction to form rib rows 37. A plurality of rib rows 37 extending in the vehicle front-rear direction are arranged with intervals in the vehicle width direction. Note that the ribs 371 shown in FIGS. 3 and 4 are merely examples. The dimensions of the ribs 371 and the intervals between them can be appropriately set. Similarly, the intervals between the rib rows 37 and the range in which the rib rows 37 are formed can also be appropriately set.

As shown in FIG. 5, a plurality of rib rows 38 are formed on the upper wall portion 331 of the upper case 33. Each rib row 38 is formed from a plurality of ribs 381 arranged along the vehicle front-rear direction. As shown in FIG. 3, each rib 381 protrudes downward from the upper wall portion 331 of the upper case 33 along the vertical line VL direction.

As shown in FIG. 5, the plurality of ribs 381 are arranged at intervals in the vehicle front-rear direction to form rib rows 38. A plurality of rib rows 38 extending in the vehicle front-rear direction are arranged at intervals in the vehicle width direction. Note that the ribs 381 illustrated in FIGS. 3 and 5 are merely examples. The dimensions of the ribs 381, the spacing between the ribs 381, and the like can be appropriately set. In addition, the spacing between rib rows 38 and the extent of the formation of rib rows 38 can also be appropriately set.

As shown in FIG. 3, the filter 40 has a bag-shaped main body 41 and an opening 42 provided at the lower part of the main body 41. When the oil OL that has entered the inside of the main body 41 leaks to the outside, the impurities contained in the oil OL are removed. The filter 40 can be made, for example, of non-woven fabric or the like. The opening 42 of the filter 40 is fixed to the inlet 34 of the lower case 32 by fusion or the like.

The main body 41 of the filter 40 is fixed to the case 31. As shown in the enlarged area of FIG. 3, the main body 41 is sandwiched between the flange F of the peripheral wall portion 322 of the lower case 32 and the flange F of the peripheral wall portion 332 of the upper case 33. That is, the flanges F of the peripheral wall portions 322 and 332 function as a fixing part of the filter 40. In FIG. 2, the range where the fixing part of the filter 40 is provided in the case 31 is shown by hatching. In the rear end portion 31A, the filter 40 is fixed by the fixing part FA (first fixing part). In the side end portions 31C and 31C, the filter 40 is fixed by the fixing part FB (second fixing part). The filter 40 is not fixed at the front end portion 31B of the case 31. That is, there is no fixing part for the filter 40 at the front end portion 31B of the case 31. As shown in FIG. 3, there is a gap between the front end portion 31B and the main body 41 of the filter 40.

As shown in FIG. 3, the main body 41 of the filter 40 is sandwiched between the rib rows 37 and 38 formed in the lower case 32 and the upper case 33 within the internal space of the case 31. The main body 41 is positioned to extend throughout the internal space of the case 31 by being sandwiched between the rib rows 37 and 38. Furthermore, a gap is secured between the filter 40 and the case 31 by the rib rows 37 and 38. As a result, even if the oil OL flows into and expands the main body 41 of the filter 40, the main body 41 is less likely to stick to the case 31.

As mentioned earlier, the oil OL is filtered by seeping from the inside to the outside of the main body 41. Once the oil OL seeps out from the main body 41, the oil OL does not return to the inside. The oil OL that has seeped out of the main body 41 circulates in the gap between the filter 40 and the case 31. In other words, the gap between the filter 40 and the case 31 forms an oil passage through which the oil OL that has flowed out from the inside of the filter 40 to the outside flows.

As shown in FIG. 3, a lower oil passage 52 is formed between the main body 41 of the filter 40 and the lower part of the case 31. An upper oil passage 53 is formed between the main body 41 of the filter 40 and the upper part of the case 31. The supply ports 35 and 36 formed in the upper part of the case 31 open into the upper oil passage 53.

As mentioned earlier, a gap is also formed between the main body 41 and the front end portion 31B of the case 31. This gap forms the end oil passage 51. As shown in FIG. 6, the end oil passage 51 connects the lower oil passage 52 and the upper oil passage 53 at the front end portion 31B of the case 31.

As shown in FIG. 3, the main body 41 of the filter 40 is inclined along the inclinations of the inclined portions 33A and 32A of the case 31. The main body 41 is inclined in a direction where the front end portion 31B side is located on the upper side compared to the rear end portion 31A side.

As shown in FIG. 6, the main body 41 has a region located below the supply port 36. In the example of FIG. 6, the end portion 45 on the front end portion 31B side of the main body 41 corresponds to the region located below the supply port 36. The "region located below the supply port 36" includes the region located below the opening 361 of the supply port 36 in the vertical line VL direction, and the surrounding region thereof. As will be described later in detail, the main body 41 of the filter 40 has a region located below the supply port 36, thereby forming an oil flow towards the supply port 35 below the supply port 36.

In the example of FIG. 6, the end portion 45 is positioned on the front end portion 31B side from the vertical line VL1 extended from the lower end 363a of the supply port 36. The end portion 45 is also positioned on the front end portion 31B side from the vertical line VL2 extended from the upper end 363b. That is, the end portion 45 overlaps the entire opening 361 of the supply port 36 in the vertical line VL direction. The end portion 45 faces the opening 361 of the supply port 36 through the gap formed by the rib rows 38.

The end portion 45 extends beyond the vertical line VL2. The upper end 43 of the end portion 45 is located near the front end portion 31B. The upper end 43 is the highest part of the end portion 45 in the vertical line VL direction. The end oil passage 51 and the upper oil passage 53 are connected at the position of the upper end 43. In FIG. 6, a horizontal line extended from the upper end 43 of the filter 40 is shown as HL1, and a horizontal line extended from the lower end 363a of the opening 361 of the supply port 36 is shown as HL2. The horizontal line HL1 is located on the upper side in the vertical line VL direction compared to the horizontal line HL2. That is, the upper end 43 of the filter 40 is located above the lower end 363a of the supply port 36.

Hereinafter, the operation of the strainer 30 will be explained.

Figure 7:
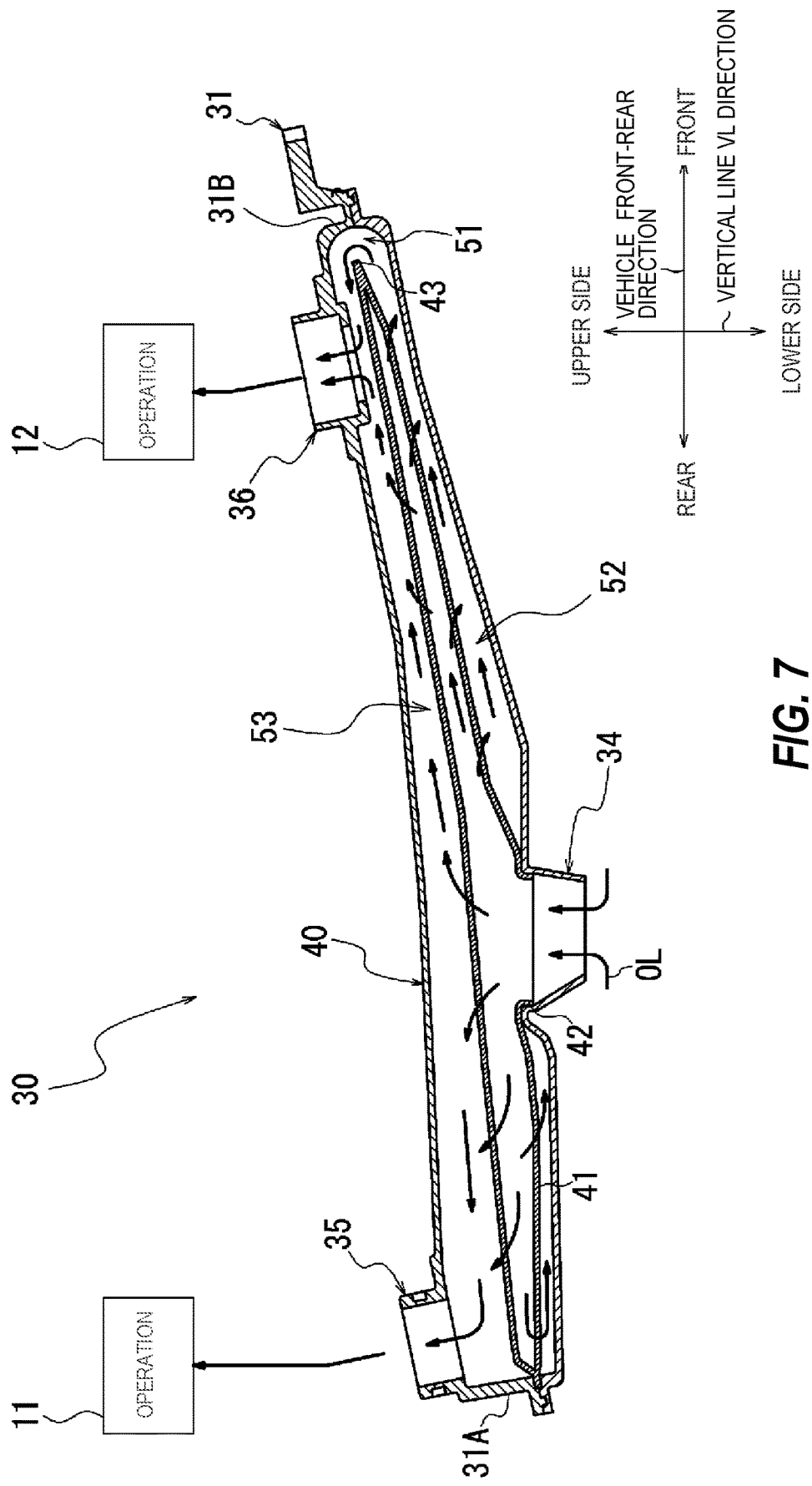
FIG. 7 is a diagram showing the flow of oil in the strainer when both the mechanical oil pump and the electric oil pump are operating.

FIG. 7 is a diagram showing the flow of oil OL in the strainer 30 when both the mechanical oil pump 11 and the electric oil pump 12 are operating.

Figure 8:
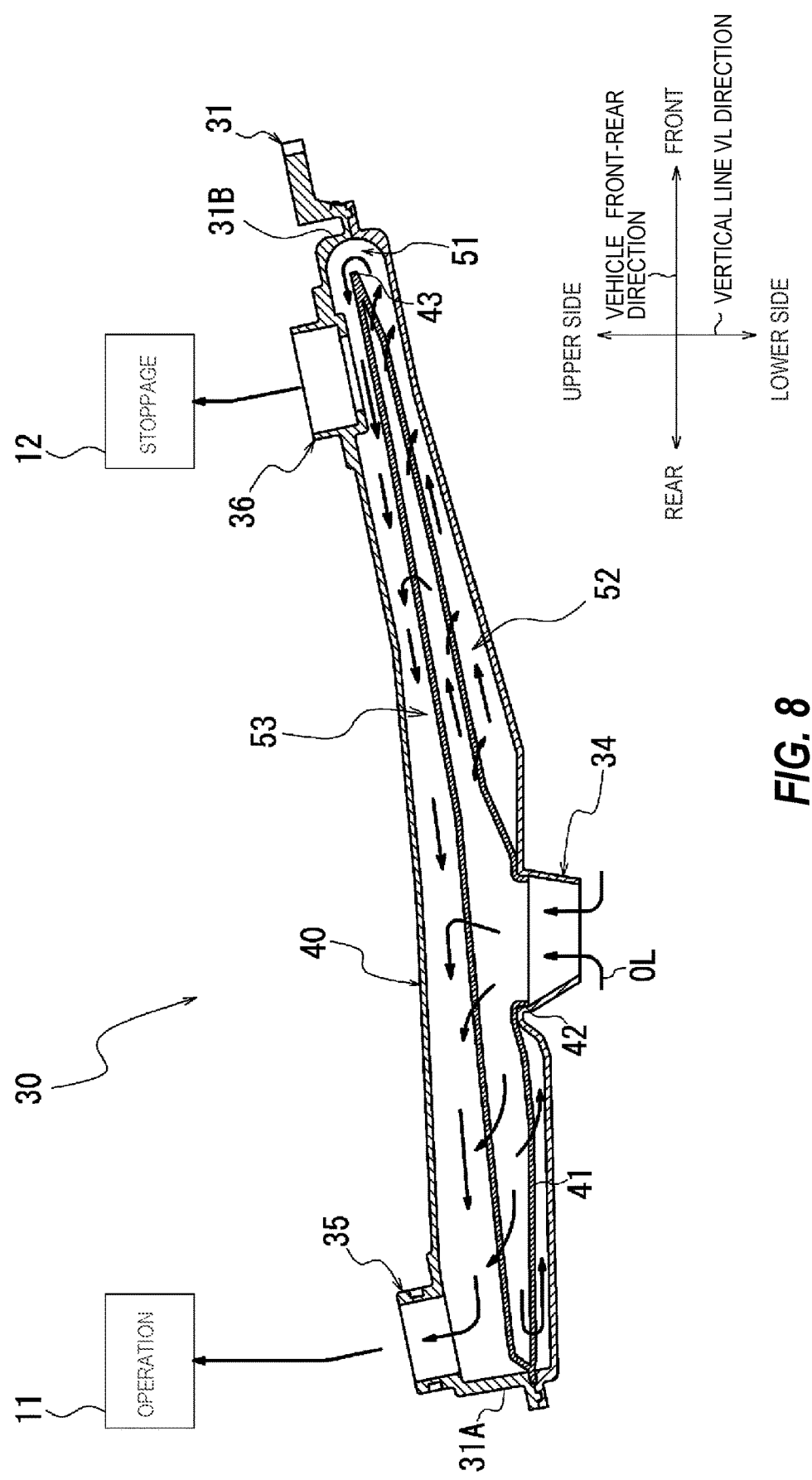
FIG. 8 is a diagram showing the flow of oil in the strainer when only the mechanical oil pump is operating.

FIG. 8 is a diagram showing the flow of oil OL in the strainer 30 when only the mechanical oil pump 11 is operating.

Figure 9:
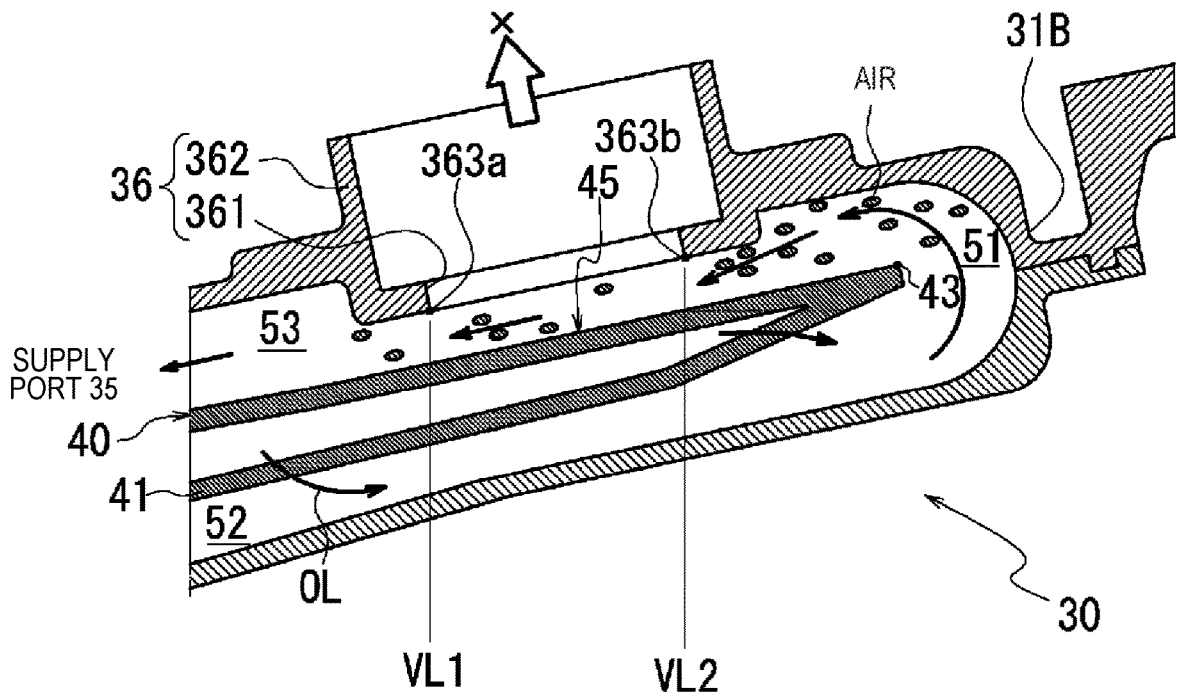
FIG. 9 is a diagram explaining the flow of oil near the supply port.

FIG. 9 is a diagram explaining the flow of oil OL near the supply port 36.

In FIGS. 7 to 9, the flow of oil OL is indicated by arrows. Also, in FIGS. 7 to 9, the ribs are omitted for clarity.

As shown in FIG. 1, when the mechanical oil pump 11 and the electric oil pump 12 operate, the oil OL stored in the oil pool PL of the oil pan 9 is sucked into the strainer 30. The oil OL flows into the main body 41 of the filter 40 through the opening 42 of the filter 40 welded to the inlet 34 of the strainer 30.

As shown in FIG. 7, when the oil OL leaks from the inside to the outside of the main body 41, impurities contained in the oil OL are removed. The oil OL that has passed through the main body 41 flows out to an oil passage formed between the main body 41 and the case 31, that is, either the lower oil passage 52, the end oil passage 51, or the upper oil passage 53.

As mentioned earlier, the rib rows 37 and 38 are arranged in the vehicle front-rear direction (from the rear end portion 31A to the front end portion 31B) at the lower and upper parts of the case 31 (refer to FIG. 4 and FIG. 5). Therefore, the oil OL that has flowed into the lower oil passage 52 and the upper oil passage 53 flows along the vehicle front-rear direction.

As shown in FIG. 7, the oil OL that has flowed into the lower oil passage 52 flows to the front end portion 31B side of the strainer 30 due to the suction force of the mechanical oil pump 11 and the electric oil pump 12. The oil OL flows into the end oil passage 51 at the front end portion 31B.

The oil OL that has flowed into the end oil passage 51 from the main body 41 moves upward due to the suction force of the mechanical oil pump 11 and the electric oil pump 12 and flows into the upper oil passage 53. Similarly, the oil OL that has flowed from the lower oil passage 52 into the end oil passage 51 also flows into the upper oil passage 53.

Here, on the side of the rear end portion 31A and side end portions 31C, 31C of the case 31, the filter 40 is fixed by being sandwiched between the case 31 (see FIG. 2). Therefore, there is no oil passage connecting the lower oil passage 52 and the upper oil passage 53, such as the end oil passage 51, between the filter 40 and the rear end portion 31A and between the filter 40 and the side end portions 31C, 31C (see FIG. 2). Therefore, the oil OL that has flowed out to the lower oil passage 52 does not directly flow into the upper oil passage 53 from the side of the rear end portion 31A and the side end portions 31C, 31C.

The oil OL that has flowed directly from the main body 41 of the filter 40 to the upper oil passage 53 is directed to the supply port 35 or supply port 36. The oil OL that goes towards the supply port 35 is sucked by the mechanical oil pump 11. The oil OL that goes towards the supply port 36 is sucked by the electric oil pump 12.

The oil OL that has flowed from the end oil passage 51 to the upper oil passage 53 goes towards the supply port 36, which is provided near the front end portion 31B, and is sucked by the electric oil pump 12.

As shown in FIG. 8, when the electric oil pump 12 stops, the oil OL is no longer sucked from the supply port 36.

The oil OL that has flowed into the lower oil passage 52 and end oil passage 51 flows into the upper oil passage 53 due to the suction force of the operating mechanical oil pump 11.

The oil OL that has flowed directly from the main body 41 to the upper oil passage 53 does not go towards the supply port 36 but goes towards the supply port 35 and is sucked by the mechanical oil pump 11.

The oil OL that has flowed from the end oil passage 51 to the upper oil passage 53 passes below the supply port 36 and goes towards the supply port 35, where the oil OL is sucked by the mechanical oil pump 11.

Here, the strainer 30 draws in the oil OL stored in the oil pool PL (see FIG. 1). The oil OL in the oil pool PL is the oil that has fallen inside the oil pan 9 after being stirred by the rotation of the transmission mechanism and flowing along the wall surface of the transmission case 7. Therefore, the oil OL drawn into the strainer 30 contains a large amount of air. The air contained in the oil OL tends to move upward in the vertical line VL direction inside the strainer 30 due to buoyancy, forming an air pool.

As mentioned earlier, the strainer 30 is inclined so that the front end portion 31B of the case 31 is positioned higher in the vertical line VL direction than the rear end portion 31A. The supply port 36 of the electric oil pump 12 is located near the front end portion 31B of the case 31. Therefore, as shown in FIG. 9, the rising air tends to accumulate around the supply port 36 near the front end portion 31B of the strainer 30. While the electric oil pump 12 is operating, it draws in the oil OL containing air through the supply port 36. As a result, it is difficult for an air pool to form. On the other hand, when the electric oil pump 12 stops, the oil OL is not drawn by the electric oil pump 12. Also, as mentioned earlier, during the stoppage of the electric oil pump 12, the check valve (not shown) closes the oil passage (not shown) connected to the supply port 36. Therefore, it is easy for an air pool to form around the supply port 36.

The configuration of the embodiment makes it easier to reduce the formation of air pools around the supply port 36. As mentioned earlier, the upper oil passage 53 is formed between the filter 40 and the upper part of the case 31. The filter 40 has an end portion 45 as a region located below the supply port 36. That is, the upper oil passage 53 communicating with the supply port 35 extends below the supply port 36. As a result, even when the electric oil pump 12 is stopped, the operation of the mechanical oil pump 11 causes a flow of oil OL towards the supply port 35 to be formed below the supply port 36. The oil OL flows from below the supply port 36 towards the supply port 35, entraining the air staying around the supply port 36 and pushing the air to the supply port 35 side (left side in the figure). This can reduce the formation of air pools around the supply port 36.

Here, the "region located below the supply port 36" of the filter 40 means a region capable of forming an oil flow toward the supply port 35 below the supply port 36. In other words, the "region located below the supply port 36" of the filter 40 is not limited to the region located below the opening 361 of the supply port 36 in the vertical line VL direction, but can include the surrounding area thereof.

Specifically, the end portion 45 of the filter 40 is preferably located in the vicinity of the vertical line VL1 extended from the lower end 363a of the supply port 36. The end portion 45 of the filter 40 is more preferably located on the front end portion 31B side from the vertical line VL1. Since the end portion 45 overlaps the opening 361 of the supply port 36 in the vertical line VL direction, it is easier to form an oil flow towards the supply port 35 below the supply port 36.

More preferably, the upper end 43 of the end portion 45 is located on the front end portion 31B side compared to the vertical line VL2. Since the end portion 45 overlaps the entire opening 361 in the vertical line VL direction, it is easier to form the flow of oil OL towards the supply port 35 below the supply port 36.

Here, we consider the case where the filter 40 is not located below the supply port 36. Specifically, it is the case where the upper end 43 of the filter 40 is significantly out of position on the supply port 35 side (left side in the figure), away from the vertical line VL1 extending from the lower end 363a of the supply port 36. In this case, the end portion 45 does not overlap the opening 361 of the supply port 36 in the vertical line VL direction. That is, the upper oil passage 53 does not extend below the supply port 36. In this case, when the electric oil pump 12 is stopped, it is difficult for the flow of oil OL toward the supply port 35 to form below the supply port 36. This makes it easy for an air pool to form around the supply port 36.

In the state where the air pool is formed, if the electric oil pump 12 is driven, the electric oil pump 12 may suck in a large amount of air and spin idly, delaying the discharge of oil OL. The electric oil pump 12 is driven when a large oil pressure is required, such as during a vehicle downshift, so it is desirable to discharge oil OL promptly.

Here, it is also conceivable to provide the supply port 36, for example, at the lower part of the case 31 so that an air pool is not formed around the supply port 36. However, in that case, the protruding length downward of the case 31 increases by the amount of the supply port 36 provided at the lower part. When the protruding amount of the case 31 downward becomes longer, the height of the oil pan (not shown) from the ground becomes lower. In such a case, it is required to secure the minimum ground clearance for the vehicle, which makes it more likely to impose constraints on the layout of the oil supply device 1 and other vehicle components.

In the embodiment, as shown in FIG. 6, the main body 41 has an end portion 45 as a region located below the supply port 36. As shown in FIG. 9, the oil OL that has flowed out from the inside of the main body 41 to the upper oil passage 53 through the end portion 45 is drawn by the suction force of the mechanical oil pump 11 and passes through the lower side of the supply port 36 to the supply port 35. In addition, since the end portion 45 overlaps the entire opening 361 of the supply port 36 in the vertical line VL direction, the amount of oil OL passing through the lower side of the supply port 36 can be increased.

Furthermore, the end portion 45 extends to the front end portion 31B. The upper end 43 of the end portion 45 connects the upper oil passage 53 and the end oil passage 51. As a result, the oil OL that has flowed out from the inside of the main body 41 to the lower oil passage 52 and the end oil passage 51 also flows into the upper oil passage 53 through the upper end 43 and passes below the supply port 36.

The oil OL, when passing below the supply port 36, entrains the air staying around the supply port 36 and pushes the air towards the supply port 35 side. This reduces the formation of air pool around the supply port 36. The suction of air when the electric oil pump 12 is driven is reduced, and the electric oil pump 12 can quickly discharge oil OL.

In addition, the upper end 43 of the end portion 45 is located on the upper side in the vertical line VL direction compared to the lower end 363a of the supply port 36. In other words, the oil OL flows from the upper end 43 on the upper side to the supply port 36 on the lower side. Therefore, when the oil OL passes below the supply port 36, the oil OL is more likely to come into contact with the air staying around the supply port 36.

Moreover, in the embodiment, as shown in FIG. 2, fixing parts FA and FB of the filter 40 are provided at the rear end portion 31A and the side end portions 31C, 31C of the case 31. On the other hand, no fixing part of the filter 40 is provided at the front end portion 31B, which is located near the supply port 36. An end oil passage 51 is provided in the front end portion 31B. Therefore, as shown in FIGS. 7 and 8, the oil OL that has flowed out from the main body 41 to the lower oil passage 52 is prevented from directly moving to the upper oil passage 53 at the rear end portion 31A and the side end portions 31C, 31C of the case 31. The oil OL that has flowed out from the main body 41 to the lower oil passage 52 reaches the upper oil passage 53 through the end oil passage 51 at the front end portion 31B and passes below the supply port 36. This ensures the flow of oil OL passing below the supply port 36 even when the suction of the electric oil pump 12 is stopped, making it easier to reduce the formation of air pools.

Below is a list of examples of strainer 30 in an embodiment of the present invention.

(1) A strainer 30 has an inlet 34 for oil OL,
  a filter 40 through which the oil OL that has flowed in from the inlet 34 passes from the inside to the outside,
  a supply port 35 (first supply port) for supplying, to the mechanical oil pump 11 (first oil pump), the oil OL that has passed through the filter 40, and
  a supply port 36 (second supply port) for supplying, to the intermittently driven electric oil pump 12 (second oil pump), the oil OL that has passed through the filter 40.

The supply port 36 is located on the upper side (upward) in the vertical line VL direction compared to the supply port 35.

The filter 40 has an end portion 45 in the region located below the supply port 36.

Specifically, (3) The strainer 30 is equipped with a case 31 in which the filter 40 is arranged inside.

The supply port 35 is formed in the vicinity of the rear end portion 31A (one end portion) of the upper part of the case 31.

The supply port 36 is formed in the vicinity of the front end portion 31B (other end portion) of the upper part of the case 31.

The case 31 is placed inside the oil pan 9 where the oil OL is stored.

The upper part of the case 31 has an inclined portion 33A on the front end portion 31B side. The inclined portion 33A is inclined so as to be located on the upper side in the vertical line VL direction as away from the rear end portion 31A.

Due to the inclined portion 33A, the supply port 36 is positioned on the upper side in the vertical line VL direction compared to the supply port 35. When the electric oil pump 12 is stopped, the air contained in the oil OL rises, making it easier for an air pool to form around the supply port 36. When driving the electric oil pump 12 in a state where an air pool has formed, the electric oil pump 12 may suck in a large amount of air and run idle. The electric oil pump 12 may experience a delay in discharging oil OL due to idling.

In the strainer 30, the end portion 45 of the filter 40 is located below the supply port 36. This allows the flow of oil OL to be formed by the suction of the mechanical oil pump 11 even when the electric oil pump 12 is stopped. The oil OL flows from below the supply port 36 towards the supply port 35. As the oil OL passes below the supply port 36, the oil OL entrains the air staying around the supply port 36 and pushes it towards the supply port 35. This reduces the formation of air pools around the supply port 36. With the reduction of air intake by the electric oil pump 12, the electric oil pump 12 can promptly discharge the oil OL.

(2) The end portion 45 (the region located below the supply port 36) of the filter 40 is preferably overlapped with the supply port 36 (the second supply port) in the vertical line VL direction. With such a configuration, the end portion 45 extends over the entire lower side of the supply port 36. This allows for an increase in the amount of oil OL that pushes air through the area below the supply port 36.

(4) The end portion 45 of the filter 40 (the region located below the 40 supply port 36) preferably extends from below the supply port 36 (the second supply port) to the front end portion 31B (the other end portion) of the case 31.

By configuring in this manner, the oil OL in the end oil passage 51 located at the front end portion 31B passes through the lower side of the supply port 36. As a result, the amount of oil OL that pushes the air can be increased.

(5) The upper end 43 of the end portion 45 (the region located below the supply port 36) of the filter 40, preferably, is positioned on the upper side (upward) in the vertical line VL direction compared to the lower end 363a of the supply port 36 (second supply port), at the front end portion 31B (the other end portion) of the case 31.

With such a configuration, the oil OL flows from the upper end 43 on the upper side towards the lower supply port 36. Therefore, when the oil OL passes below the supply port 36, the oil OL is more likely to come into contact with the air staying around the supply port 36.

(6) The case 31 preferably has a fixing part FA (first fixing part) for fixing the filter 40, provided at the rear end portion 31A.

The case 31 preferably has an end oil passage 51 provided at the front end portion 31B and guiding, to the upper part of the case 31, the oil OL that has passed the lower part of the case 31 from the inside of the filter 40.

The fixing part FA can be formed, for example, from the flange F at the upper end of the peripheral wall portion 322 of the lower case 32 and the flange F at the lower end of the peripheral wall portion 332 of the upper case 33. The main body 41 of the filter 40 is fixed by being sandwiched between the lower case 32 and the upper case 33. This eliminates the need for a separate fixing tool for the filter 40. The number of components of the strainer 30 can be reduced. Also, by sandwiching the main body 41 between the lower case 32 and the upper case 33, it is possible to prevent the oil OL from moving upward from the lower part of the case 31 at the rear end portion 31A. This makes it easier for the oil OL to be guided to the front end portion 31B where the end oil passage 51 is provided. As the oil OL moves from the end oil passage 51 at the front end portion 31B to the upper part of the case 31, the oil OL passes below the supply port 36 provided near the front end portion 31B. This makes it easier for the oil OL to push the air around the supply port 36.

(7) The case 31 preferably includes a fixing part FB (second fixing part) for fixing the filter 40. The fixing part FB can be provided on the side end portions 31C, 31C connecting the rear end portion 31A and the front end portion 31B.

The fixing part FB can be, for example, constituted by the flange F at the upper end of the peripheral wall portion 322 of the lower case 32 and the flange F at the lower end of the peripheral wall portion 332 of the upper case 33. The main body 41 of the filter 40 is fixed by being sandwiched between the flanges F of the lower case 32 and the upper case 33. This eliminates the need for a separate fixing tool for the filter 40. The number of parts for the strainer 30 is reduced. Also, by having the main body 41 sandwiched between the lower case 32 and the upper case 33, it is possible to prevent oil OL from moving from the lower part to the upper part of the case 31 at the side end portions 31C, 31C. The oil OL is easily guided to the front end portion 31B provided with the end oil passage 51. As the oil OL moves from the end oil passage 51 of the front end portion 31B to the upper part of the case 31, the oil OL passes below the supply port 36 provided near the front end portion 31B. As a result, the oil OL can easily push the air around the supply port 36.

(8) The strainer 30 preferably includes a rib 371 (first rib). The rib 371 is formed at the lower part of the case 31. The rib 371 protrudes toward the upper part of the case 31. The rib 371 is arranged in the direction from the rear end portion 31A to the front end portion 31B, that is, along the vehicle front-rear direction.

The rib 371 ensures a gap between the filter 40 and the lower part of the case 31. This gap forms a lower oil passage 52 that allows oil OL to flow from the filter 40 to the lower part of the case 31. Also, by arranging the rib 371 in the vehicle front-rear direction, the oil OL in the lower oil passage 52 is guided to flow into the end oil passage 51 formed on the front end portion 31B side of the case 31.

(9) The strainer 30 preferably includes a rib 381 (second rib). The rib 381 is formed on the upper part of the case 31. The rib 381 protrudes toward the lower part of the case 31. The rib 381 is arranged along the direction from the front end portion 31B to the rear end portion 31A.

The rib 381 ensures a gap between the filter 40 and the upper part of the case 31. This gap forms an upper oil passage 53, which circulates the oil OL that has flowed into the upper part of the case 31. Also, the rib 381 is arranged along the vehicle front-rear direction. As a result, the oil OL in the upper oil passage 53 is guided to the supply port 35 provided on the rear end portion 31A side and the supply port 36 provided on the front end portion 31B side.

In the embodiment described above, an example without a fixing part for the filter 40 at the front end portion 31B of the case 31 is shown, but it is not limited to this embodiment. For example, the filter 40 may be fixed to a part of the front end portion 31B by a fixing tool or the like. In this case, the end oil passage 51 may be formed at a location where the fixing tool is not provided on the front end portion 31B.

In FIG. 6 and the like, an example was described in which the end portion 45 of the filter 40 is extended from below the supply port 36 to the front end portion 31B of the case 31, but this is not limited to this embodiment. The arrangement of the filter 40 can be appropriately changed as long as the filter 40 has a region located below the supply port 36.

Figure 10:
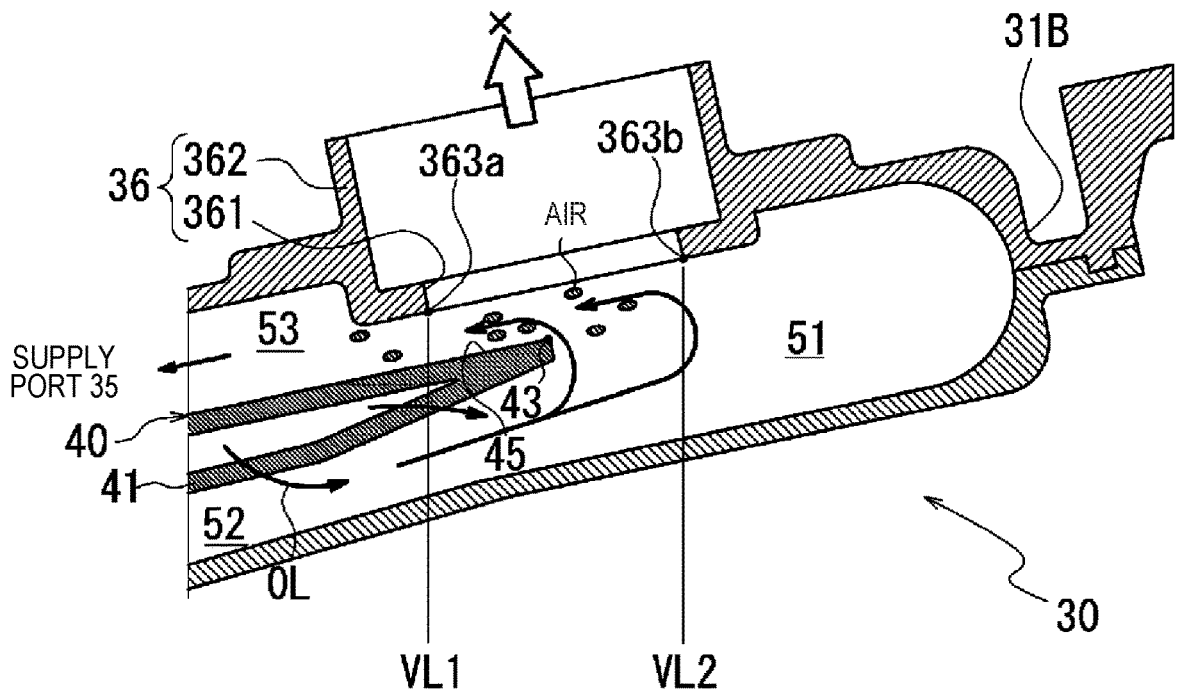
FIG. 10 is a diagram showing a modified example.

FIG. 10 is a diagram showing a modified example.

In FIG. 10, the end portion 45 of the filter 40 is located on the front end portion 31B side, compared to the vertical line VL1 extending from the lower end 363a of the supply port 36. However, the end portion 45 is located on the rear end portion 31A side, compared to the vertical line VL2 extending from the upper end 363b of the supply port 36. That is, the end portion 45 overlaps a part of the opening 361 of the supply port 36 in the vertical line VL direction.

In this case, a flow of oil OL is formed below the supply port 36, heading towards the supply port 35. By pushing the air staying around the supply port 36 with oil OL, the formation of air pools can be reduced. In addition, in the modified example, the end oil passage 51 becomes larger, so the resistance when the oil OL flows through the end oil passage 51 can be reduced. Furthermore, the amount of oil OL flowing through the end oil passage 51 can be increased.

In the embodiment described above, as shown in FIG. 6, an example was explained in which the upper end 43 of the end portion 45 is located on the upper side in the vertical line VL direction compared to the lower end 363a of the supply port 36, but it is not limited to this embodiment. For example, the upper end 43 may be located on the lower side in the vertical line VL direction compared to the lower end 363a of the supply port 36. Alternatively, the upper end 43 may be located on the upper side in the vertical line VL direction compared to the upper end 363b of the supply port 36.

In one embodiment of the present invention, an example of providing a strainer in an oil supply device installed in a vehicle has been described, but this is not limited to this embodiment. The strainer can also be applied to oil supply devices installed outside of vehicles.

Above, the embodiments of the present invention have been described, but the above embodiments merely illustrate one example of the application of the present invention, and it is not intended to limit the technical scope of the present invention to the specific configuration of the above embodiments.

DESCRIPTION OF REFERENCE SIGNS

1 Oil supply device
9 Oil pan
11 Mechanical oil pump (first oil pump)
12 Electric oil pump (second oil pump)
30 Strainer
31 Case
31A Rear end portion (one end portion)
31B Front end portion (other end portion)
31C Side end portion
32 Lower case
32A Inclined portion
33 Upper case
33A Inclined portion
34 Inlet
34 Supply port (first supply port)
36 Supply port (second supply port)
371 Rib (first rib)
381 Rib (second rib)
40 Filter
43 Upper end
45 End portion (region located below the supply port)
51 End oil passage
52 Lower oil passage
53 Upper oil passage
FA Fixing part (first fixing part)
FB Fixing part (second fixing part)

The present application claims a priority of Japanese Patent Application No. 2021-013971 filed with the Japan Patent Office on Jan. 29, 2021, all the contents of which are hereby incorporated by reference.

The invention claimed is:

1. A strainer comprising:
an inlet for oil;
a filter through which the oil that has flowed in from the inlet passes from inside to outside;
a first supply port for supplying, to a first oil pump, the oil that has passed through the filter; and
a second supply port for supplying, to an intermittently driven second oil pump, the oil that has passed through the filter;
wherein the second supply port is located more upward than the first supply port; and
the filter has a region located below the second supply port;
the strainer further comprising a case in which the filter is arranged inside; wherein
the first supply port is formed on a side of one end portion of an upper part of the case;
the second supply port is formed on a side of the other end portion of the upper part of the case;
the case comprising:
a first fixing part for fixing the filter, provided at the one end portion; and
an end oil passage provided at the side of the other end portion and guiding, to the upper part of the case, the oil that has passed a lower part of the case from the inside of the filter.

2. The strainer according to claim 1, wherein the region is overlapped with the second supply port in a vertical line direction.

3. The strainer according to claim 1, wherein the upper part of the case has an inclined portion on a side of the other end portion.

4. The strainer according to claim 1, wherein the region extends from below the second supply port toward the side of the other end portion of the case.

5. The strainer according to claim 1, wherein an upper end of the region is positioned more upward than a lower end of the second supply port, on the side of the other end portion of the case.

6. The strainer according to claim 1, wherein the case comprises:
a second fixing part for fixing the filter, provided on a side end portion connecting the one end portion and the other end portion.

7. The strainer according to claim 1, further comprising a first rib formed at the lower part of the case and protruding toward the upper part of the case; the first rib being arranged in a direction from the one end portion to the other end portion.

8. The strainer according to claim 1, further comprising a second rib formed at the upper part of the case and protruding toward the lower part of the case; the second rib being arranged in a direction from the other end portion to the one end portion.

* * * * *